United States Patent [19]

Model et al.

[11] 3,860,604
[45] Jan. 14, 1975

[54] IMINOISOINDOLINONE DYESTUFFS

[75] Inventors: Ernst Model, Basel; Sandor Gati, Birsfelden, both of Switzerland

[73] Assignee: Ciba-Geigy Corporation, Ardsley, N.Y.

[22] Filed: Nov. 29, 1973

[21] Appl. No.: 420,117

[30] Foreign Application Priority Data
Dec. 5, 1972 Switzerland.................. 17657/70

[52] U.S. Cl. .............. 260/308 B, 106/23, 106/176, 106/288 Q, 260/29.4 R, 260/37 P, 260/39 P, 260/41 C, 260/764
[51] Int. Cl. ........................................... C07d 57/00
[58] Field of Search ................................ 260/308 B

[56] References Cited
UNITED STATES PATENTS
3,499,908  3/1970  Vollmann et al. .............. 260/308 R
3,646,033  2/1972  Leister et al. .................. 260/308 B Primary Examiner—Alton D. Rollins

[57] ABSTRACT

Iminoisoindolinone dyestuffs of the formula

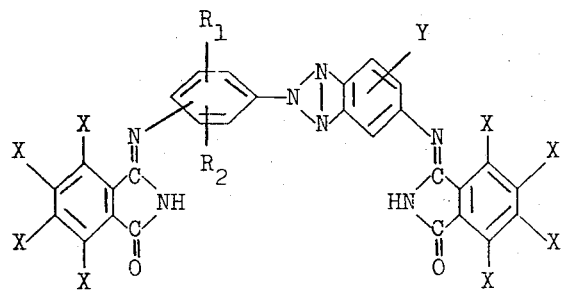

wherein $R_1$, $R_2$ and Y denote hydrogen or halogen atoms or alkyl or alkoxy groups containing 1–4 carbon atoms and the X denotes halogen atoms, are useful for coloring plastics and lacquers in yellow shades of excellent fastness properties.

7 Claims, No Drawings

IMINOISOINDOLINONE DYESTUFFS

It has been found that new valuable iminoisoindolinone dyestuffs of the formula

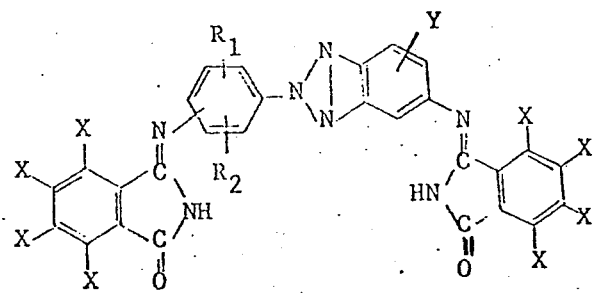

(I)

wherein $R_1$, $R_2$ and Y denote hydrogen or halogen atoms or alkyl or alkoxy groups containing 1 – 4 carbon atoms and the X denotes halogen atoms are obtained when a diamine of the formula

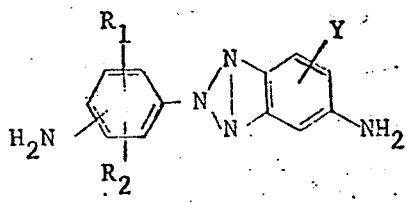

is condensed in the molar ratio of 1:2 with a 4,5,6,7-tetrahalogenoisoindolinone-1 which contains easily exchangeable substituents in the 3-position, which due to their nature or number require two bonds and are more mobile than the oxygen in the 1-position.

Dyestuffs of particular interest are those of the formula (I) wherein the X denotes chlorine atoms and the left-hand iminoisoindolinone radical is in the 3- or 4-position and the radicals $R_1$ and $R_2$ are in the 3-, 4- or 6-position.

Examples of starting substances used are 4,5,6,7-tetrabromoisoindolines or, preferably, 4,5,6,7-tetrachloroisoindolines. As easily exchangeable substituents in the 3-position they contain, for example, 2 halogen atoms, especially chlorine atoms, two secondary amino groups, for example containing 1 to 4 carbon atoms, for example piperidino or morpholino groups, an imino group or a thio group or, in particular, two alkoxy groups, for example alkoxy groups containing 1 to 4 carbon atoms, especially methoxy groups. These starting substances are known.

The diamines used are preferably those of the formula

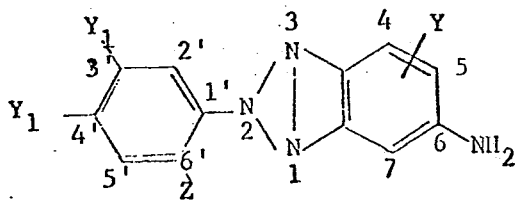

wherein Y has the indicated meaning, one $Y_1$ denotes a hydrogen or halogen atom or an alkyl or alkoxy group containing 1 – 4 carbon atoms and the other denotes an amino group, and Z denotes a hydrogen or halogen atom or an alkyl or alkoxy group containing 1 – 4 carbon atoms.

The following diamines may be mentioned as examples: 2',6'-diamino-2-phenylbenztriazole, 3',6'-diamino-2-phenylbenztriazole, 4',6'-diamino-2-phenylbenztriazole, 2',6-diamino-4'-chloro-2-phenylbenztriazole, 4',6-diamino-2'-chloro-2-phenylbenztriazole, 4',6-diamino-3'-chloro-2-phenylbenztriazole, 4',6-diamino-5-chloro-2-phenylbenztriazole, 3',6-diamino-5-chloro-2-phenylbenztriazole, 4',6-diamino-3',5-dichloro-2-phenylbenztriazole, 2',6-diamino-4'-methyl-2-phenylbenztriazole, 3',6-diamino-2'-methyl-2-phenylbenztriazole, 4',6-diamino-2'-methyl-2-phenylbenztriazole, 3',6-diamino-4-methyl-2-phenylbenztriazole, 4',6-diamino-3'-methyl-2-phenylbenztriazole, 3',6-diamino-5-methyl-2-phenylbenztriazole, 3',6-diamino-7-methyl-2-phenylbenztriazole, 3',6-diamino-4',5-dimethyl-2-phenylbenztriazole, 3',6-diamino-2',5-dimethyl-2-phenylbenztriazole, 3',6-diamino-2',7-dimethyl-2-phenylbenztriazole, 4',6-diamino-2',5'-dimethyl-2-phenylbenztriazole, 4',6-diamino-2',5',5-trimethyl-2-phenylbenztriazole, 2',6-diamino-4'-methoxy-2-phenylbenztriazole, 3',6-diamino-5-methoxy-2-phenylbenztriazole, 4',6-diamino-3'-methoxy-2-phenylbenztriazole, 4',6-diamino-5-methoxy-2-phenylbenztriazole, 4',6-diamino-3',5-dimethoxy-2-phenylbenztriazole, 4',6-diamino-2',5'-dimethoxy-2-phenylbenztriazole, 3',6-diamino-5,6'-dimethoxy-2-phenylbenztriazole, 4',6-diamino-2',5,5'-trimethoxy-2-phenylbenztriazole, 3',6-diamino-6'-methoxy-2-phenylbenztriazole, 3',6-diamino-4'-methyl-5-chloro-2-phenylbenztriazole, 3',6-diamino-6'-methyl-5-chloro-2-phenylbenztriazole, 4',6-diamino-6'-methyl-5-chloro-2-phenylbenztriazole, 4',6-diamino-3'-methyl-5-chloro-2-phenylbenztriazole, 4',6-diamino-5-methyl-3'-chloro-2-phenylbenztriazole, 4',6-diamino-7-methyl-5'-chloro-2-phenylbenztriazole, 3',6-diamino-6'-methoxy-5-chloro-2-phenylbenztriazole, 4',6-diamino-3'-methoxy-5-chloro-2-phenylbenztriazole, 4',6-diamino-5-methoxy-3'-chloro-2-phenylbenztriazole, 3',6-diamino-6'-methyl-5-methoxy-2-phenylbenztriazole, 3',6-diamino-5-methyl-6'-methoxy-2-phenylbenztriazole, 3',6-diamino-4'-methyl-5-methoxy-2-phenylbenztriazole, 4',6-diamino-2'-methyl-5'-methoxy-2-phenylbenztriazole, 4',6-diamino-5-methyl-3'-methoxy-2-phenylbenztriazole, 4',6-diamino-3'-methyl-5-methoxy-2-phenylbenztriazole, 4',6-diamino-2'-methyl-5-methoxy-2-phenylbenztriazole, 4',6-diamino-7-methyl-3'-methoxy-2-phenylbenztriazole, 4',6-diamino-2',5'-dimethyl-5-methoxy-2-phenylbenztriazole, 4',6-diamino-5-methyl-2',5'-dimethoxy-2-phenylbenztriazole, 4',6-diamino-7-methyl-2',5'-dimethoxy-2-phenylbenztriazole and 4',6-diamino-2'-methyl-5,5'-dimethoxy-2-phenylbenztriazole.

These diamines can be manufactured according to known processes and are in most cases known.

The condensation in part takes place even in the cold but if necessary by warming the intimately mixed components, and particularly advantageously in the presence of inert organic solvents, that is to say organic solvents which do not participate in the reaction.

If 3-imino-, 3-thio- or 3,3-bis-tert.amino-4,5,6,7-tetrachloroisoindolin-1-ones or alkali metal salts of 3,3-dialkoxy-4,5,6,7-tetrachloroisoindolin-1-ones are used as starting materials, water-miscible organic solvents are used advantageously, for example lower aliphatic alcohols, such as lower alkanols, for example methanol, isopropanol or butanol, lower cyclic ethers, such as dioxane, ethylene glycol monomethyl ether or lower aliphatic ketones, such as acetone. The condensation in that case takes place even at relatively low temperatures. It is advantageously carried out in the presence of base-binding agents; as examples of these there should be mentioned lower fatty acids which can then simultaneously serve as solvents, especially acetic acid.

When using 3,3-dihalogeno-4,5,6,7-tetrachloroisoindolin-1-ones, organic solvents which are free of hydroxyl groups are preferred, such as hydrocarbons, for example aromatic hydrocarbons, such as benzene, toluene, xylene, tetrahydronaphthalene or diphenyl, or cycloaliphatic hydrocarbons, for example cyclohexane, but also halogenated hydrocarbons, such as aliphatic halogenated hydrocarbons, for example carbon tetrachloride or tetrachloroethylene, or aromatic halogenated hydrocarbons, such as chlorobenzene or dichlorobenzenes and trichlorobenzenes, and also aromatic nitro-hydrocarbons, such as nitrobenzene, ethers, including aliphatic ethers, such as dibutyl ether, aromatic ethers, such as diphenyl ether, or cyclic ethers, such as dioxane, and ketones, such as acetone, or esters, especially esters of lower fatty acids with lower alkanols, such as ethyl acetate, these being used in the presence of acid-binding agents.

The new pigment precipitates from the reaction medium immediately after it is formed. For certain purposes, it can be used direct as the crude pigment; it can however also be improved further in its properties, especially with regard to purity, form and hiding power, by methods which are in themselves known, for example by extraction with organic solvents or by grinding with grinding auxiliaries which can subsequently be removed again, for example salts.

The new dyestuffs are valuable pigments which in a finely divided form can be used for pigmenting high molecular organic material, for example cellulose ethers and cellulose esters, such as ethylcellulose, acetylcellulose, and nitrocellulose, polyamides or polyurethanes or polyesters, natural resins or synthetic resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile, polyacrylic acid esters and thermoplastic or curable acrylic resins, rubber, casein, silicone and silicone resins, individually or as mixtures. It is immaterial whether the high molecular compounds mentioned are in the form of plastic masses or melts or in the form of spinning solutions, lacquers or printing inks. Depending on the end use, it proves advantageous to use the new pigments as toners or in the form of preparations.

EXAMPLE 1

A hot solution of 5.6 g of 4',6-diamino-2-phenylbenztriazole in 200 ccs of o-dichlorobenzene is added to a solution of 17 g of 3,3,4,5,6,7-hexachloroisoindolin-1-one in 100 ml of o-dichlorobenzene. A yellow precipitate forms immediately. The suspension is heated to 160°–170° whilst stirring and is kept thereat for 2 hours.

The insoluble pigment is filtered off at 130° and washed with methanol, acetone and water. After drying, 17 g of a yellow powder are obtained, which can be used direct, in this form, for dyeing plastics. The dyeings achieved thereby are distinguished by very good fastness to migration and to light.

EXAMPLE 2

18.2 g. of 4,5,6,7-tetrachloro-3,3-dimethoxy-isoindolin-1-one are dissolved in 55 ml of a 1 N solution of sodium methylate in methanol. 5.6 g of 3',6-diamino-2-phenylbenztriazole are now added and the mixture is heated to the boil for 1 hour. After adding 100 ml of 1,2-dichlorobenzene the temperature is raised to 100° whilst distilling off methanol. The sodium salt of the pigment separates out. After addition of a further 100 ml of 1,2-dichlorobenzene and 20 ml of glacial acetic acid, the temperature is raised to 140°–145° and the mixture is stirred at this temperature for 2 hours. The pigment which has precipitated is filtered off at 120°, washed with methanol, acetone and water and dried in vacuo at 70°. 17 g of a greenish-tinged yellow pigment which, when incorporated into plastics, gives dyeings of very good fastness to light, are obtained.

EXAMPLE 3

16.5 g of 3,4,5,6-tetrachlorocyanobenzoic acid methyl ester and 55 ml of a 1 N sodium methylate solution in methanol are stirred to give a clear solution. The sodium salt of 3,3-dimethoxy-4,5,6,7-tetrachloroisoindolin-1-one results. 6.3 g of 3',6-diamino-6'-methoxy-2-phenylbenztriazole are now rinsed in with a little methanol, whilst stirring well, and 100 ml of o-dichlorobenzene are added. The temperature is now raised to 100° whilst methanol distills off. The sodium salt of the pigment separates out, The mixture is diluted with a further 100 ml of o-dichlorobenzene and acidified with 20 ccs of glacial acetic acid, the temperature is raised to 140° and the mixture is kept thereat for 2 hours whilst stirring well. The insoluble pigment is filtered off at 120° and washed with methanol, acetone and water. After drying, 17.5 g of a strongly colored yellow pigment are obtained, which can be used direct, in this form, for dyeing plastics and for the manufacture of printing pastes and colored paints. The dyeings produced therewith are distinguished by excellent fastness properties.

EXAMPLE 4

If instead of 3,4,5,6-tetrachlorocyanobenzoic acid methyl ester equimolecular amounts of 3,4,5,6-tetrabromocyanobenzoic acid methyl ester (melting point 122°–124°) are used and the procedure indicated is followed, a yellow pigment is obtained, which when incorporated into plastics gives dyeings on excellent fastness to light.

EXAMPLES 5 – 59

The table which follows describes the manufacture of further dyestuffs which are obtained if, following the instructions of Example 3, 3,4,5,6-tetrachlorocyanobenzoic acid methyl ester is condensed with the diaminophenylbenztriazoles indicated in column II. Column III shows the shade of the resulting dyestuffs.

| No. | Diaminophenylbenztriazole | Shade |
|---|---|---|
| 5 | 2',6-Diamino-2-phenylbenztriazole | Yellow |
| 6 | 2',6-Diamino-4'-chloro-2-phenylbenztriazole | Yellow |
| 7 | 2',6-Diamino-4'-methoxy-2-phenylbenztriazole | Yellow |
| 8 | 2',6-Diamino-4'-methyl-2-phenylbenztriazole | Yellow |
| 9 | 3',6-Diamino-6'-methyl-2-phenylbenztriazole | Yellow |
| 10 | 3',6-Diamino-2-phenylbenztriazole | Yellow |
| 11 | 3',6-Diamino-4'-methyl-2-phenylbenztriazole | Yellow |
| 12 | 3',6-Diamino-5,6'-dimethoxy-2-phenylbenztriazole | Greenish-tinged yellow |
| 13 | 3',6-Diamino-5-methoxy-2-phenylbenztriazole | do. |
| 14 | 3',6-Diamino-6'-methyl-5-methoxy-2-phenylbenztriazole | do. |
| 15 | 3',6-Diamino-4'-methyl-5-methoxy-2-phenylbenztriazole | Yellow |
| 16 | 3',6-Diamino-5-methyl-2-phenylbenztriazole | Yellow |
| 17 | 3',6-Diamino-4',5-dimethyl-2-phenylbenztriazole | do. |
| 18 | 3',6-Diamino-5,6'-dimethyl-2-phenylbenztriazole | Greenish-tinged yellow |
| 19 | 3',6-Diamino-5-methyl-6'-methoxy-2-phenylbenztriazole | Yellow |
| 20 | 3',6-Diamino-5-chloro-2-phenylbenztriazole | Greenish-tinged yellow |
| 21 | 3',6-Diamino-5-chloro-4'-methyl-2-phenylbenztriazole | Greenish-tinged yellow |
| 22 | 3',6-Diamino-5-chloro-6'-methyl-2-phenylbenztriazole | do. |
| 23 | 3',6-Diamino-7-methyl-2-phenylbenztriazole | Yellow |
| 24 | 3',6-Diamino-6',7-dimethyl-2-phenylbenztriazole | do. |
| 25 | 3',6-Diamino-5-chloro-6'-methoxy-2-phenylbenztriazole | do. |
| 26 | 4',6-Diamino-2-phenylbenztriazole | do. |
| 27 | 4',6-Diamino-3'-methyl-2-phenylbenztriazole | Reddish-tinged yellow |
| 28 | 4',6-Diamino-3'-chloro-2-phenylbenztriazole | Yellow |
| 29 | 4',6-Diamino-2'-chloro-2-phenylbenztriazole | Greenish-tinged yellow |
| 30 | 4',6-Diamino-2'-methyl-2-phenylbenztriazole | do. |
| 31 | 4',6-Diamino-3'-methoxy-2-phenylbenztriazole | Reddish-tinged yellow |
| 32 | 4',6-Diamino-5-chloro-2-phenylbenztriazole | Yellow |
| 33 | 4',6-Diamino-5-chloro-6'-methyl-2-phenylbenztriazole | Greenish-tinged yellow |
| 34 | 4',6-Diamino-5-chloro-3'-methyl-2-phenylbenztriazole | Yellow |
| 35 | 4',6-Diamino-5-chloro-3'-methoxy-2-phenylbenztriazole | Reddish-tinged yellow |
| 36 | 4',6-Diamino-3',5-dichloro-2-phenylbenztriazole | Yellow |
| 37 | 4',6-Diamino-2',5'-dimethyl-2-phenylbenztriazole | Yellow |
| 38 | 4',6-Diamino-2'-methyl-5'-methoxy-2-phenylbenztriazole | do. |
| 39 | 4',6-Diamino-2',5'-dimethoxy-2-phenylbenztriazole | do. |
| 40 | 4',6-Diamino-5-methyl-2-phenylbenztriazole | do. |
| 41 | 4',6-Diamino-3',5-dimethyl-2-phenylbenztriazole | Brown-yellow |
| 42 | 4',6-Diamino-5,6'-dimethyl-2-phenylbenztriazole | Yellow |
| 43 | 4',6-Diamino-3'-methoxy-5-methyl-2-phenylbenztriazole | Yellow-orange |
| 44 | 4',6-Diamino-3'-chloro-5-methyl-2-phenylbenztriazole | Yellow |
| 45 | 4',6-Diamino-3',5,6'-trimethyl-2-phenylbenztriazole | do. |
| 46 | 4',6-Diamino-5-methyl-3',6'-dimethoxy-2-phenylbenztriazole | do. |
| 47 | 4',6-Diamino-7-methyl-2-phenylbenztriazole | do. |
| 48 | 4',6-Diamino-3'-chloro-7-methyl-2-phenylbenztriazole | do. |
| 49 | 4',6-Diamino-3',7-dimethyl-2-phenylbenztriazole | Reddish-tinged yellow |
| 50 | 4',6-Diamino-3'-methoxy-7-methyl-2-phenylbenztriazole | do. |
| 51 | 4',6-Diamino-7-methyl-3',6'-dimethoxy-2-phenylbenztriazole | Yellow |
| 52 | 4',6-Diamino-5-methoxy-2-phenylbenztriazole | do. |
| 53 | 4',6-Diamino-3'-methyl-5-methoxy-2-phenylbenztriazole | Yellow-orange |
| 54 | 4',6-Diamino-6'-methyl-5-methoxy-2-phenylbenztriazole | Yellow |
| 55 | 4',6-Diamino-3',5-dimethoxy-2-phenylbenztriazole | do. |
| 56 | 4',6-Diamino-3'-chloro-5-methoxy-2-phenylbenztriazole | Reddish-tinged yellow |
| 57 | 4',6-Diamino-3',6'-dimethyl-5-methoxy-2-phenylbenztriazole | Yellow |
| 58 | 4',6-Diamino-2'-methyl-5,5'-dimethoxy-2-phenylbenztriazole | Greenish-tinged yellow |
| 59 | 4',6-Diamino-2',5,5'-trimethoxy-2-phenylbenztriazole | Yellow |

EXAMPLE 60

2 g of the pigment manufactured according to Example 3 are ground with 36 g of hydrated alumina, 60 g of linseed oil varnish of medium viscosity and 2 g of cobalt linoleate on a triple roll mill. The yellow prints produced with the resulting printing paste are strongly coloured and of outstanding fastness to light.

EXAMPLE 61

0.6 g of the pigment manufactured according to Example 1 are mixed with 67 g of polyvinyl chloride, 33 g of dioctyl phthalate, 2 g of dibutyl tin dilaurate and 2 g of titanium dioxide and worked on a roll mill for 15 minutes at 160°C to give a thin sheet. The yellow dyeing thus produced is strongly colored and fast to migration, heat and light.

EXAMPLE 62

10 g of titanium dioxide and 2 g of the pigment manufactured according to Example 3 are ground for 48 hours in a ball mill with 88 g of a mixture of 26.4 g of coconut alkyd resin, 24.0 g of melamine-formaldehyde resin (50 percent solids content), 8.8 g of ethylene glycol monomethyl ether and 28.8 g of xylene.

If this lacquer is sprayed onto an aluminum foil, predried for 30 minutes at room temperature and then stoved for 30 minutes at 120°C, a yellow lacquering results, which is distinguished by very good fastness to overlacquering, light and weathering coupled with good color strength.

We claim:

1. An iminoisoindolinone dyestuff of the formula

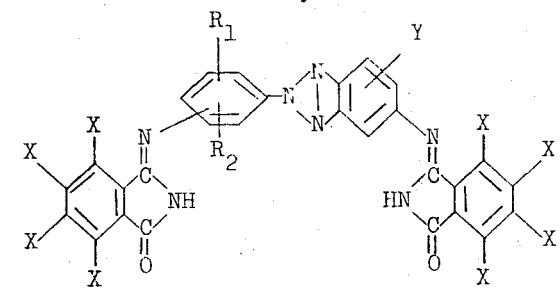

wherein $R_1$, $R_2$ and Y denote hydrogen or halogen atoms or alkyl or alkoxy groups containing 1–4 carbon atoms and the X denotes halogen atoms.

2. An iminoisoindolinone dyestuff according to claim 1, wherein the X denotes chlorine atoms and the left-hand iminoisoindolinone radical is in the 3- or 4-position and the radicals $R_1$ and $R_2$ are in the 3-, 4- or 6-position.

3. The compound according to claim 1 of the formula

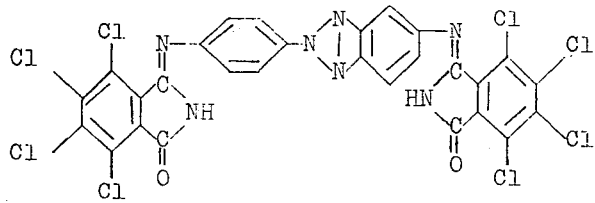

4. The compound according to claim 1 of the formula

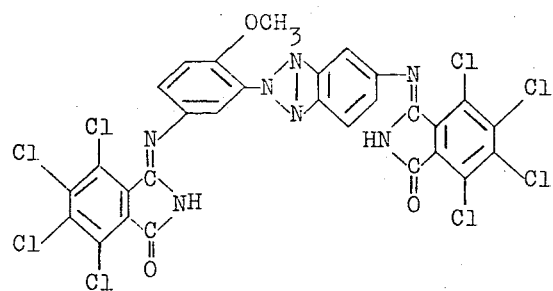

5. The compound according to claim 1 of the formula

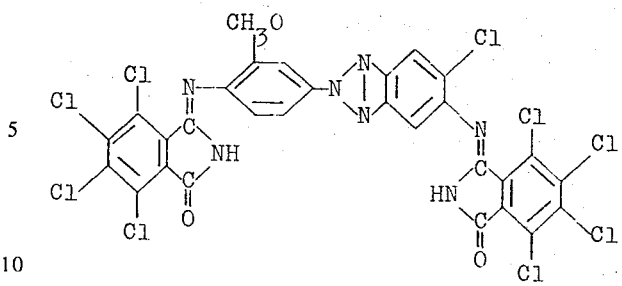

6. The compound according to claim 1 of the formula

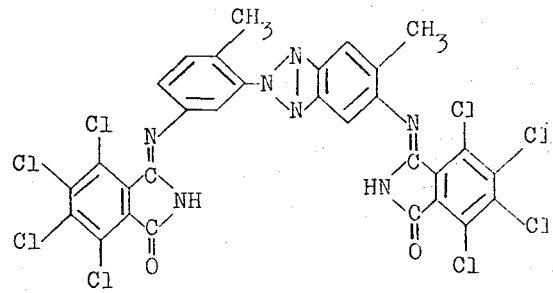

7. The compound according to claim 1 of the formula

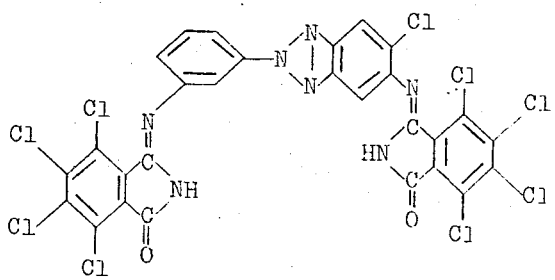

* * * * *